United States Patent
Shanley

(10) Patent No.: US 10,133,696 B1
(45) Date of Patent: Nov. 20, 2018

(54) BRIDGE, AN ASYNCHRONOUS CHANNEL BASED BUS, AND A MESSAGE BROKER TO PROVIDE ASYNCHRONOUS COMMUNICATION

(71) Applicant: VMware, Inc., Palo Alto, CA (US)

(72) Inventor: Dave Shanley, Ashland, VA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/635,053

(22) Filed: Jun. 27, 2017

(51) Int. Cl.
*G06F 3/00* (2006.01)
*G06F 13/40* (2006.01)
*G06F 9/54* (2006.01)

(52) U.S. Cl.
CPC .......... *G06F 13/4045* (2013.01); *G06F 9/544* (2013.01)

(58) Field of Classification Search
CPC ...................................................... G06F 9/544
See application file for complete search history.

(56) References Cited

U.S. PATENT DOCUMENTS

| | | | |
|---|---|---|---|
| 9,693,382 B2* | 6/2017 | Kahn | H04W 76/16 |
| 9,697,061 B1* | 7/2017 | Lazier | G06F 9/547 |
| 2014/0280948 A1* | 9/2014 | Schmidt | H04L 47/827 709/226 |
| 2017/0371950 A1* | 12/2017 | Perna | G06Q 30/0623 |

* cited by examiner

*Primary Examiner* — Tammara R Peyton

(57) ABSTRACT

In a system and method for using a bridge, an asynchronous channel based bus, and a message broker to provide asynchronous communication, the bridge monitors at least one Galactic channel on the bus. The bridge receives every message sent on the Galactic channel, and converts each message from a channel message format used by the Galactic channel to a common message format. The bridge utilizes a socket to broadcast each converted message to, and receive messages from, a message broker. The bridge determines that a message received from the message broker is destined for the Galactic channel. The bridge converts the message into the channel message format used by the Galactic channel and distributes the converted message to the Galactic channel.

20 Claims, 5 Drawing Sheets

BRIDGE, AN ASYNCHRONOUS CHANNEL BASED BUS, AND A MESSAGE BROKER TO PROVIDE ASYNCHRONOUS COMMUNICATION

RELATED APPLICATIONS

This application is related to co-pending U.S. application Ser. No. 15/635,015, filed on Jun. 27, 2017, entitled "A Bridge and Asynchronous Channel Based Bus to Provide UI-to-UI Asynchronous Communication," by Dave Shanley, and assigned to the assignee of the present application.

This application is related to co-pending U.S. application Ser. No. 15/635,043, filed on Jun. 27, 2017, entitled "An Asynchronous Channel Based Bus And Bridge Architecture Enabling Decoupled Services," by Dave Shanley, and assigned to the assignee of the present application.

This application is related to co-pending U.S. application Ser. No. 15/635,073, filed on Jun. 27, 2017, entitled "Schema To Ensure Payload Validity For Communications On An Asynchronous Channel Based Bus," by Dave Shanley, and assigned to the assignee of the present application.

BACKGROUND

Virtual-machine technology essentially abstracts the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Within virtual servers as well as physical servers, virtual machines and virtual applications can be moved among multiple virtual or physical processors in order to facilitate load balancing and to co-locate compatible virtual machines and virtual applications with respect to virtual and physical processors. Similarly, virtual machines and virtual applications can be moved among the virtual servers within a virtual data center as well as among physical servers within the underlying physical hardware within which virtual data centers are constructed. Migration of virtual machines and virtual applications within virtual data centers can also be used for load balancing, fault tolerance and high availability, and for many other purposes.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
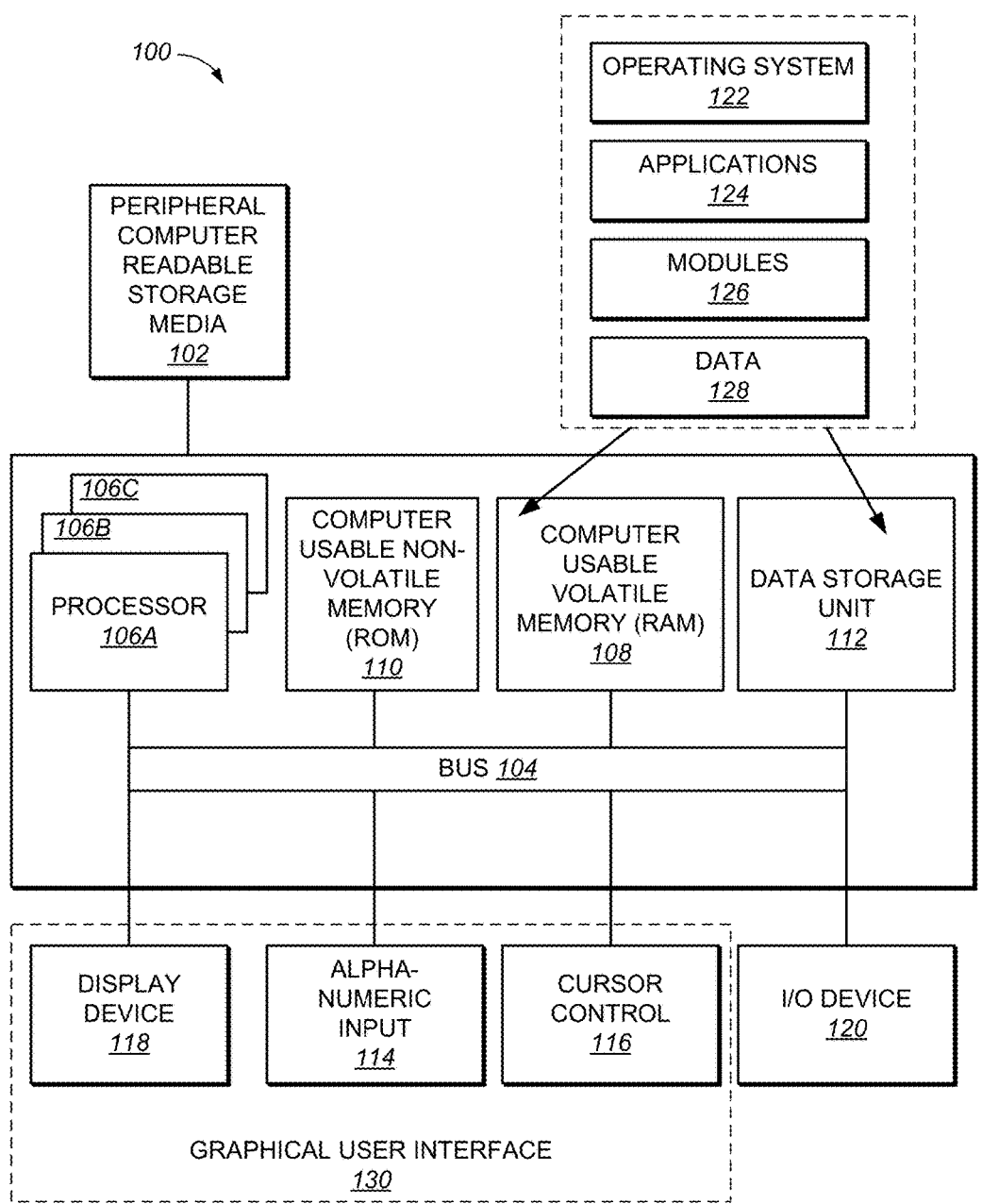
FIG. 1 illustrates an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "connecting," "displaying," "receiving," "providing," "determining," "generating," "establishing," "managing," "extending," "creating," "migrating," "effectuating," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system environment, upon which embodiments of the present invention may be implemented. An example cloud-based computing environment, upon which embodiments of the present invention may be implemented, is then discussed. An example UI is then described. An example system having a bridge, an asynchronous channel based bus, and a message broker to provide asynchronous communication is shown in accordance with various embodiments, are then described.

Modern computing can be considered to be a collection of many different levels of abstraction above the physical computing-hardware level that includes physical computer systems, data-storage systems and devices, and communications networks.

The biggest challenge when attempting to build integration between separate products or distributed systems, is sourcing, delivering and sharing multiple streams of real-time data between multiple layers of middleware and the consumers and producers they are serving. Typically, companies such as VMware employ private API's or SDK's to pull or push data to and from products that talk to one another.

Example embodiments described herein provide a method for using a bridge, an asynchronous channel based bus, and a message broker (AKA Bifröst) to provide asynchronous communication. In one embodiment, Bifröst is a reusable component written in TypeScript. It makes use of technologies such as Simple (or Streaming) Text Orientated Messaging Protocol (STOMP), ReactiveX/Stream based programming, and the like, to build a completely decoupled, fully asynchronous, distributed message bus. The Bifröst allows any UI, service, microservice, or platform to send and receive asynchronous messages between one another all without requiring any additional technology or custom integrations. Existing and legacy applications and middleware written in any language (e.g., Java) can also use the Bifröst architecture to send and receive messages to UI's and/or other services. In one embodiment, the library is delivered by npm and integrates seamlessly into any JavaScript/Typescript or Angular 4+ based application. In another embodiment, the Bifröst is written in Java and can be used by any Java 8+ application. In both embodiments, the API's match as closely as possible.

In general, STOMP refers to an interoperable wire format used to dramatically simplify the communication between clients and message brokers across a variety of languages, brokers and platforms. It is designed as an alternative to more complex protocols like advanced message queuing protocol (AMQP).

Importantly, the embodiments of the present invention, as will be described below, provide an approach for asynchronous communication which differs significantly from the conventional processes used in API communication. In conventional approaches, API frameworks allow for dependency injection across API's. Normally developers create services that are injected into controllers. Services often have other services injected into them also. Whilst this pattern works for smaller applications, it quickly becomes unmanageable with large applications like the vSphere Webclient. Services and views quickly become tightly coupled and modularity becomes difficult to maintain when tens of services are injected in multiple areas. Such conventional approaches are deleteriously affected by API updates or changes, tedious, time-consuming, and often result in clunky client side code with API work arounds.

Instead, the present embodiments, as will be described and explained below in detail, provide a previously unknown procedure for utilizing a bridge, an asynchronous channel based bus, and a message broker (Bifröst) to provide asynchronous communication. The asynchronous channel based bus provides two core services. The first is to allow the dynamic creation and subsequent destruction of channels within the bus. The second is to allow any actor to publish and/or subscribe to those channels and broadcast messages. The bridge is a completely decoupled module that depends only on the bus. Its function is to extend specific channels on the bus out to an application's message broker, platform or designated microservice. These extended channels are referred to herein as Galactic channels.

As will be described in detail, the various embodiments of the present invention do not merely implement conventional API communication processes on a computer. Instead, the various embodiments of the present invention, in part, provide a previously unknown procedure for providing a bridge, an asynchronous channel based bus, and a message broker in combination to provide asynchronous communication. Hence, embodiments of the present invention provide a novel process for asynchronous communication which is necessarily rooted in computer technology to overcome a problem specifically arising in the realm of API communication between separate products or distributed systems.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a UI 130 under the direction of a processor (e.g., processor 106A or processors 106A, 106B, and 106C). UI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Example Cloud-Based Computing Environment

Figure 2:
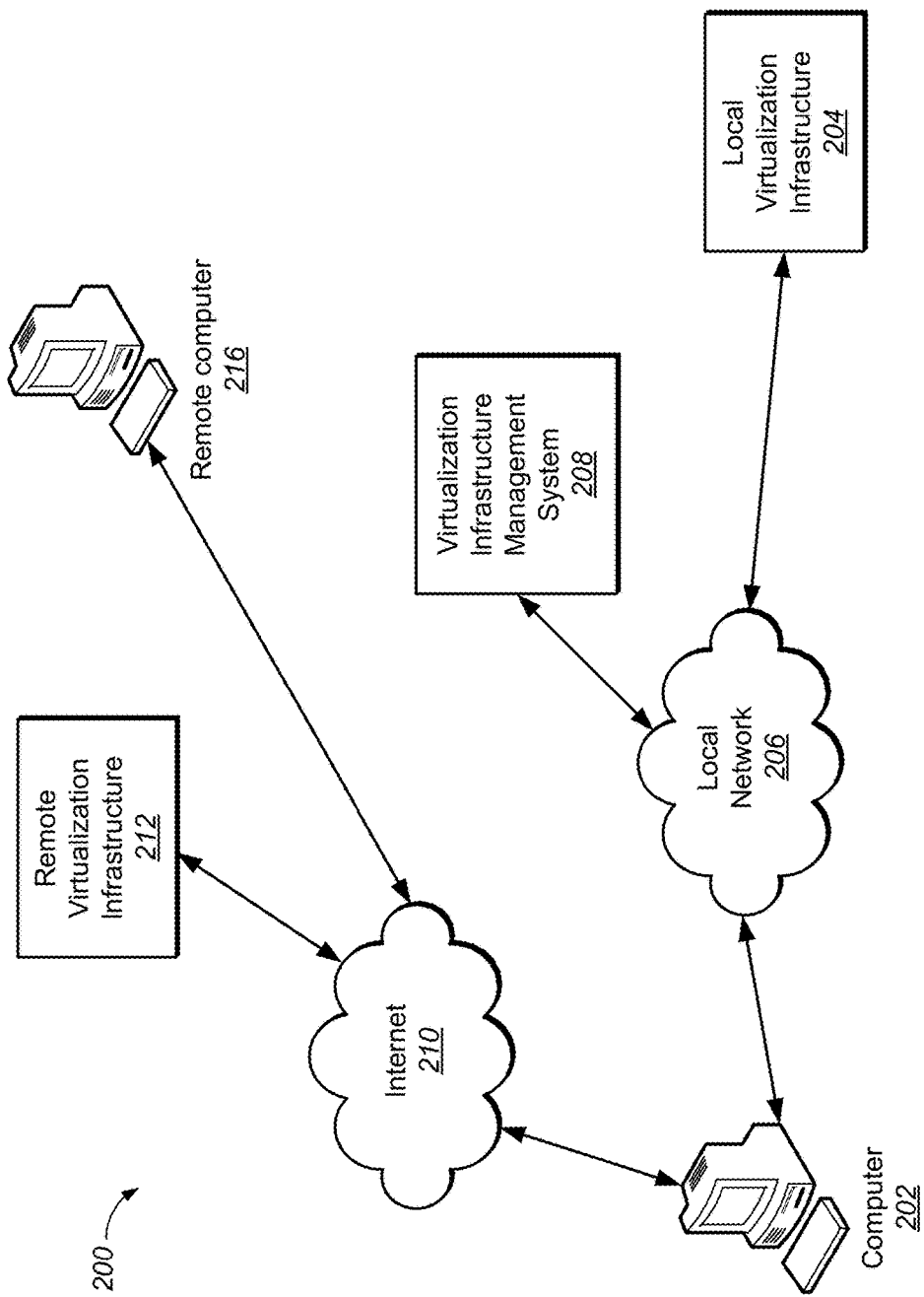
FIG. 2 illustrates an example cloud-based computing environment upon which embodiments described herein may be implemented.

FIG. 2 illustrates an example cloud-based computing environment 200 upon which embodiments described herein may be implemented. In the cloud-computing paradigm, computing cycles and data-storage facilities are provided to organizations and individuals by cloud-computing providers. In addition, larger organizations may elect to establish private cloud-computing facilities in addition to, or instead of subscribing to computing services provided by public cloud-computing service providers. In FIG. 2, a system administrator for an organization, using a computer system 202, accesses the organization's local virtualization infrastructure 204 (e.g., a private cloud) through a local network 206 and also accesses, through the Internet 210, a remote virtualization infrastructure 212 (e.g., a public cloud). In various embodiments, access to local virtualization infrastructure 204 is through a private cloud services interface and/or access to remote virtualization infrastructure 212 is through a public cloud services interface.

It should be appreciated that that local virtualization infrastructure 204 can be any type of virtualization infrastructure (e.g., VMware vSphere™), that remote virtualization infrastructure 212 can be any type of virtualization infrastructure (e.g., VMware vCloud Air) and that virtualization infrastructure management system 208 can be any type of system for managing and creating components of a virtualization infrastructure (e.g., VMware vSphere™ VCenter™ or vCloud Air Web Portal).

For example, the administrator can, in either the case of local virtualization infrastructure 204 or remote virtualization infrastructure 212, using virtualization infrastructure management system 208, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote computer system 216.

Cloud-computing facilities may provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 3:
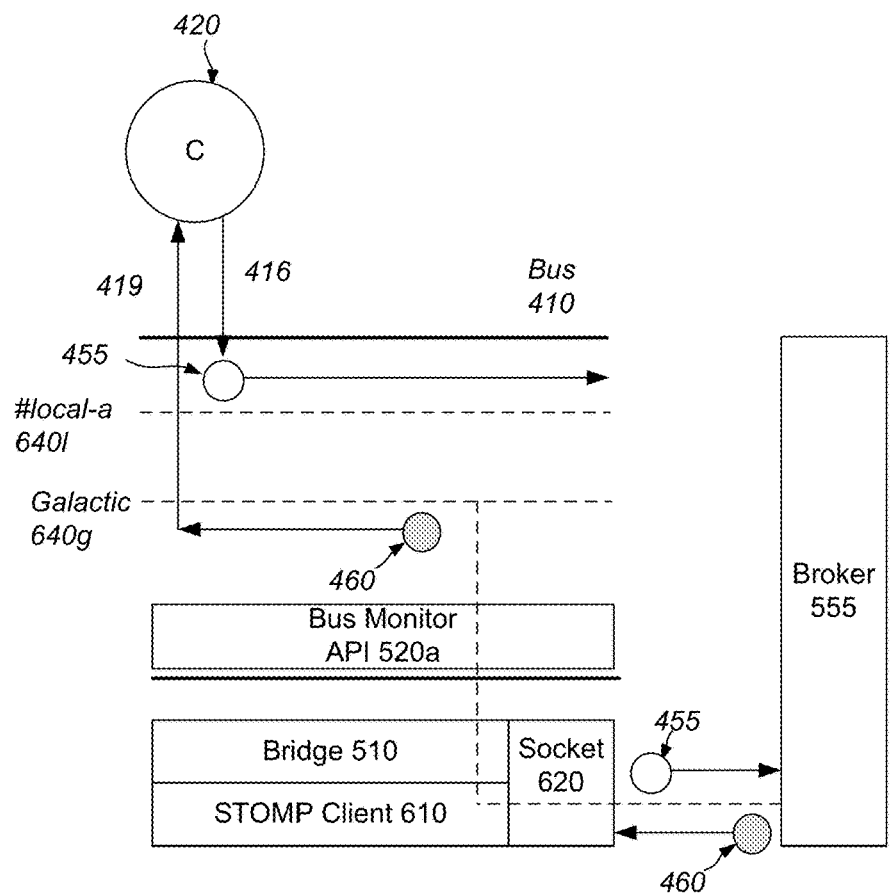
FIG. 3 illustrates the architecture for a bridge transparently extending a bus to and from the message broker, in accordance with various embodiments.

FIG. 3 illustrates the architecture 300 for a bridge 510 transparently extending a bus 410 to and from a message broker 555.

Bus

Figure 4:
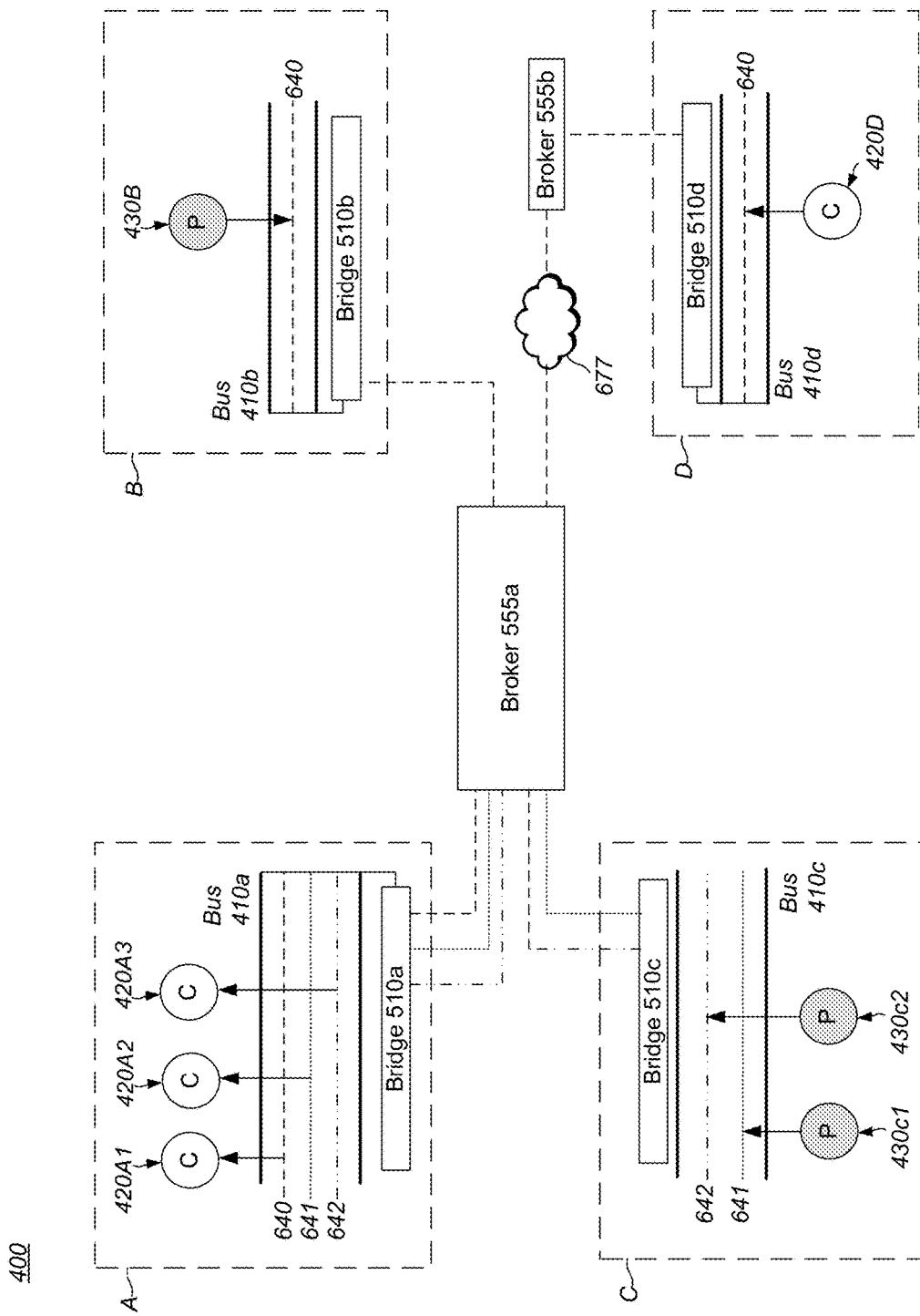
FIG. 4 illustrates the architecture of a plurality of different applications all communicating via the distributed buses, in accordance with various embodiments.

The use of bus 410 offers architectures a simple, yet elegant way to share information between publishers and subscribers across a local or distributed system. Bus 410 creates a system of consumer(s) 420 and producer(s) 430 (as shown in FIG. 4). The asynchronous nature of bus 410 is ideal for services, microservices, user interfaces (UIs), and the like.

In one embodiment, bus 410 creates a peer to peer (P2P) architecture between all components, thereby removing the need to keep adding hops to a call stack and increasing blocked calls. Bus 410 allows each message to be performed in small asynchronous units of work, that clears the call stack and lets another actor process or send a message, or render a component. Bus 410 essentially allows every message to be processed as a cycle of the event loop (a core part of a browser) or the main application thread instead of being a blocked call in a chain.

The channel based bus 410 that provides two core services. The first is to allow the dynamic creation and subsequent destruction of channel(s) 640 within bus 410. The second is to allow any actor (e.g., consumer(s) 420 and/or producer(s) 430 of FIG. 4) to publish and/or subscribe to those channel(s) 640 and broadcast messages. Operation is analogous with a chat system like Slack or IRC. A channel 640 can be requested by any actor to which bus 410 is visible, if the channel 640 doesn't exist, it is created. In one embodiment, when there are no more subscribers to a channel 640, the channel 640 is destroyed. Bus 410 allows actors which mainly consist of services and controllers, to send and receive messages 455 and 460 between each other. These messages 455 and 460 can be any type of data such as objects, strings, arrays, streams, collections, or maps.

As stated herein, actors can be considered consumer(s), producer(s), or both. Consumer(s) 420 can issue requests 416 and listen for responses 419, producer(s) 430 can listen for requests and issue responses, As long as an actor can see bus 410, they are able to communicate with any other actor within the local or remote system.

In one embodiment, a consumer(s) 420 (or something that needs data) can make a request for data by sending an outbound request message 455 to the topic channel 640 on bus 410. Request message 455 will be broadcast to any subscribed actors listening to request messages on that same channel 640. In this example, Galactic channel 640g and local-a 640l are used as the topic channels.

A producer(s) 430 (as shown in FIG. 4) provides data and listens for outbound requests on its topic channel 640. Once the producer(s) 430 receives the request message 455, it can perform whatever operations it requires. When the producer(s) 430 is ready, it sends an inbound response message 460 to the topic channel 640 on bus 410. The consumer(s) 420 is subscribed to the Galactic channel 640 also, but is only listening to inbound response messages 460. The consumer(s) 420 will pick up the broadcast message and be able to continue on.

In one embodiment, all of bus 410 activity is handled in a non-blocking and asynchronous manner. In one embodiment, bus 410 makes use of a ReactiveX framework as the foundation. This facilitates the asynchronous/stream based communication. In so doing, bus 410 enables true decoupling of components and services inside applications. Bus 410 becomes the only dependency and is also context neutral. In other words, bus 410 is unaware of the application(s) it's embedded in.

For example, consumer(s) 420 should be able to hop into a channel 640, send a request on the channel. Meanwhile, producer(s) that can meet the request are also listening on the channel. The producer(s) receives the request 455 and then provides the request response 460 on the channel 640g. Consumer 420 will receive the request response 460 on the channel 640g.

For example, a REST service listens to messages on a REST channel designed for components (e.g., consumer 420) that want to send out a REST response to an API. A component will say on a REST channel, I want to make a call, go get me some VMs or go get me some users. The component (e.g., consumer 420) that sends the request will then go back to idle. The REST service will take the message and make the XHR/HTTP call needed to go get the data; once the data is returned to the REST service, the REST service will take the returned data and put the data on the message bus on the REST channel. The component that made the call will note the returned data on the REST channel.

In so doing, the component that made the call does not need to know about the REST service, HTTP or the API. Doesn't need to know where the data comes from, how it is processed, or who gets it. It merely needs to listen for responses on the channel. In other words, services, controllers and views have all been decoupled. Instead of communicating with each other through dependency injection or the like, they communicate through message channels on the bus 410. The messaging is all asynchronous so there is no sitting and waiting, only when something else comes down the channel will the application wake up and start handling it.

In one embodiment, the component can send the request on a first channel (e.g., a public channel) and further request that the response be sent on a second separate channel (e.g., a private channel).

In one embodiment, there is no global list of channels, no whitelist of channels or the like received by the components coupled with bus 410. It is a multi-cast communication channel that can be created on demand by a consumer or producer. If no one is listening on the channel then nothing will be sent and, in one embodiment, the messages are dropped from the bus.

In another embodiment, a request to bus 410 can be made by a consumer and/or producer to provide the different channels available on the bus. In another embodiment, there may be a registration, a list of pre-defined channels, etc.

Bridge

FIG. 4 illustrates the architecture 400 for a bridge 510 transparently extending bus 410 to and from the message broker 555. In one embodiment, bridge 510 is a completely decoupled module that depends only on bus 410. The function of bridge 510 is to extend specific channel(s) 640 on bus 410 out to an application's message broker 555 (broker 555 may be a broker, platform, designated microservice or the like). In general, these extended channel(s) 640 are referred to herein as Galactic channels.

In one embodiment, bridge 510 operates by making use of a monitor API 520 that bus 410 provides. Monitor API 520 broadcasts channel 640 events relating to creation, subscription, un-subscription and destruction. Events relating to Galactic channels are what bridge 510 really cares about. In one embodiment, bridge 510 ignores all non-Galactic events. In one embodiment, to identify #local vs Galactic or extended channel(s) 640, the following hash convention plus snakecase is used: #local-channel vs Galactic-channel (no hash). However, it should be appreciated that there are no specific limitations on the naming of local vs Galactic channels, the previous convention is merely one of a number of different possible ways to delineate the difference between the local and Galactic channel.

FIG. 3 illustrates how bridge 510 transparently subscribes to Galactic channel 640g and then proxies request message(s) 455 and response message(s) 460 to and from the message broker 555. It achieves this by listening for Galactic channel 640g traffic, converting request message 455 and response message 460 to and from STOMP client 610 and then sending and receiving messages 455 and 460 over a Socket 620. It further ignores local channel 640l traffic.

In one embodiment, socket 620 is a WebSocket. In general, when a live feed/stream is needed, a browser (or platform) can use sockets (e.g., WebSockets or regular sockets) to create a bidirectional string (it is normally unidirectional). Live feed via the socket 620 is used to send live feed updates (metric, notification, alert, network change, etc.) to the UI and for the UI be able to capture the live feed updates.

When bridge 510 receives a Galactic channel 640g event, it will act as a global broker for that channel and extend the channel out to message broker 555, another service that supports STOMP, or the like. In one embodiment, bus 410 has no knowledge that bridge 510 is operating, neither do the peers (e.g., producer(s) 430 and consumer(s) 420) sending requests and responses. Bridge 510 handles all of the proxying of messages transparently. In other words, bridge 510 acts as the glue between bus 410 and multiple STOMP enabled message broker(s) 555, connected over WebSocket 620.

In one embodiment, bridge 510 has benefits that hide and abstract a lot of complexity. For example, bridge 510 transparently handles all of the WebSocket 620 and session management across multiple message broker(s) 555. In one embodiment, bridge 510 reads raw STOMP frames being sent from message broker 555 and then parses and distributes the messages to the Galactic channel(s) 640g that match the destination of the message. In order to maintain the Galactic channel organization, bridge 510 subscribes to a topic or queue that matches the name of the Galactic channel 640g on bus 410. Once subscribed, bridge 510 will relay any messages 455 and 460 sent to or from any Galactic channel 640g and the mapped topics/queues.

In one embodiment, bridge 510 handles message broker 555 communications via an interoperable wire format such as STOMP 1.2. That is, messages 455 and 460 sent on Galactic channel(s) 640g are marshalled and unmarshalled into STOMP commands that are both transmitted and received by message broker 555. In one embodiment, bus 410 is not aware of STOMP commands; instead, bridge 510 takes care of it all.

For example, when data is desired (e.g., metrics, Virtual machines, user data, etc.), the component can subscribe to all the channels locally, bridge 510 will extend the channels to their own topics on the message broker 555, and, in one embodiment, all through a single socket 620. That is, in one embodiment, every subscribed channel by the component is passed through the single socket 620.

The bridge will receive the response messages from the message broker and then provide the response messages to the local channel related to the initial request. Thus, bridge 510 allows multiple systems to talk to each other without knowing they are talking to remote systems. They think they are talking to a local message bus but they are actually extended to any number of systems.

For example, they are sending things on local channels 640l or Galactic channels 640g, if it is sent on a Galactic channel 640g, the monitor API 520 realizes it is a message 455 on a Galactic channel 640g, takes the message 455 to bridge 510 through the STOMP client 610 and over the WebSocket 620 and transports it to the broker 555 and anyone listening. A listening component coupled with the broker/platform 555 will receive the message 455 and send a response 460 back to the WebSocket 620, through the STOMP client 610 up to the bridge 510 and the bridge 510 will put the response 460 on the proper channel 640g.

In one embodiment, bus 410 and bridge 510 don't require any additional technologies other than the language they are written in and the ReactiveX framework to operate. An existing application message broker 555 (like Spring) could instantly be adapted to communicate over STOMP. In one embodiment, bus 410 and bridge 510 inside the Bifröst is written in TypeScript and Java and depends on reactive extensions for JavaScript (RxJS) and Java (RxJava). In general, the STOMP implementation does not require any third party libraries as it is custom built using the STOMP 1.2 specification.

Since service call chaining no longer exists, all operations can happen asynchronously. This not only provides a huge performance improvement over blocking chained calls, but it also allows developers to build new architectures that focus on a stream and event based/reactive world. Further, it facilitates designers to construct new experiences based on stream driven data, particularly if the data is live streaming via the Bridge.

In one embodiment, services can make requests and handle responses with just a few lines of code. For example, request message(s) 455 and response message(s) 460 can be handled with class methods, or closures. E.g.:
const bus=new MessagebusService( );
/* will log 'response: echo [hello!]' */
bus.respondOnce("#local-channel").generate(
    (request: string)=>{
    return "echo ["+request+"]";
    }
);

bus.requestOnce("#local-channel", "hello!").handle(
    (response: string)=>{
    console.log("response:"+echo);
    }
};

The Bridge allows components using the Bus to treat distributed (Galactic) channels as regular channel(s) 640; the process of how those messages are broadcast to remote consumers is completely abstracted away from the developer. That is, there is no requirement to learn the complexities of WebSocket 620 communications, STOMP, or handling multiple streams with data arriving asynchronously.

Individual components inside a UI or service can communicate directly with other services or UI components locally or remotely via bridge 510. No other component needs to know about the conversations happening between other UI components, message broker(s) 555 and headless microservices. This allows a selection menu in a UI to request data over a Galactic channel 640g from a microservice running somewhere. Only the dropdown component and the microservice would know about the conversation and the rest of the application could remain idle.

In one embodiment, bridge 510 has a socket watchdog that will reconnect if there is an error or a disconnect between bridge 510 and message broker 555.

The Bifröst architecture allows a browser based UI to talk directly to a message broker 555 over WebSocket 620. It also allows any other non-browser based application or microservice to communicate with a message broker 555 using standard sockets. In both cases, the same simple protocol to send and receive messages is used.

In other words, using bridge 510, the service will send the information on the channel, the bridge will be able to translate the information (via the STOMP) before it is put on the broker/platform and translate the response before it is put back on the channel to the service. In so doing, each different service can universally communicate. Thereby providing a real-time distributed architecture where producers and consumers can talk to each other asynchronously by any number of remote systems and local systems. Thus, using BifrOst, the concept of local and remote no longer matters; resulting in scalability, distribution, extension, speed, performance, etc.

That is, bridge 510 allows the application to connect to multiple message broker(s) 555 at the same time and create and consume multiple streams of data that can be bound together to create new streams. Message broker(s) 555 can be distributed/relayed and expand Galactic channels 640g out across clouds and DMZ's. Moreover, messages 455 and 460 can be relayed between message broker(s) 555 to connect services and UI's across different networks, all transparently.

In general, broker 555 can be a single broker or a pool of brokers. Messages are stateless. Further, in one embodiment, the message(s) are queued by the broker so that the component will not miss a message if it is down/away/occupied, etc.

Decoupled System Communication

FIG. 4 illustrates the architecture 400 of a plurality of different applications all communicating via the distributed buses. In one embodiment, four different applications (A-D) are communicating via the distributed buses 410-410d, two applications (A and D) are producing content, another two (B and C) are consuming. In one embodiment, application D is connected to the distributed bus 410 via a relay 677.

The buses 410-410d in combination with the bridges 510a-510d, provide the mechanisms to handle multiple streams of data inside an application (via channel(s) 640-642 on the different buses) and also provides the ability to distribute and manage these streams across applications. For example, bus 410 has three Galactic channels 640-642, bridge 510a (and the components as shown in detail in FIG. 3) provides the content to bridges 510b-510d via broker 555a and broker 555b via relay 677. As shown in FIG. 4, channel 640 has consumer 420A1 in Application A, consumer 420D in Application D, and producer 430B in Application B able to provide and receive messages thereon via the monitoring provided by bridge 510a, bridge 510b and bridge 510c respectively.

Channel 641 has consumer 420A2 in Application A and producer 430c1 in Application C able to provide and receive messages thereon via the monitoring provided by bridge 510a and bridge 510c respectively.

Channel 642 has consumer 420A3 in Application A and producer 430c2 in Application C able to provide and receive messages thereon via the monitoring provided by bridge 510a and bridge 510c respectively.

Thus, architects can now design systems without the concern of distributed control planes or worrying about integrations and API's. User experience designers can imagine UI's and workflows composed from multiple streams of data from different applications and microservices. Dashboards can now source information from as many services as can be supported. The Bifröst allows designers and developers to create single UI's for applications that consume data across multiple products or even across entire networks.

With a distributed Galactic bus, UI components only need to worry about two things, which channel(s) 640-642 to ask for data on and how to render that data to the user. The data could be supplied by another application connected to the same broker on the same Galactic channel. Thus, bus 410 and bridge 510 that make up the Bifröst allows for UI's to be modularly constructed decoupled, asynchronous and lazily loaded.

Example Methods of Operation

Figure 5:
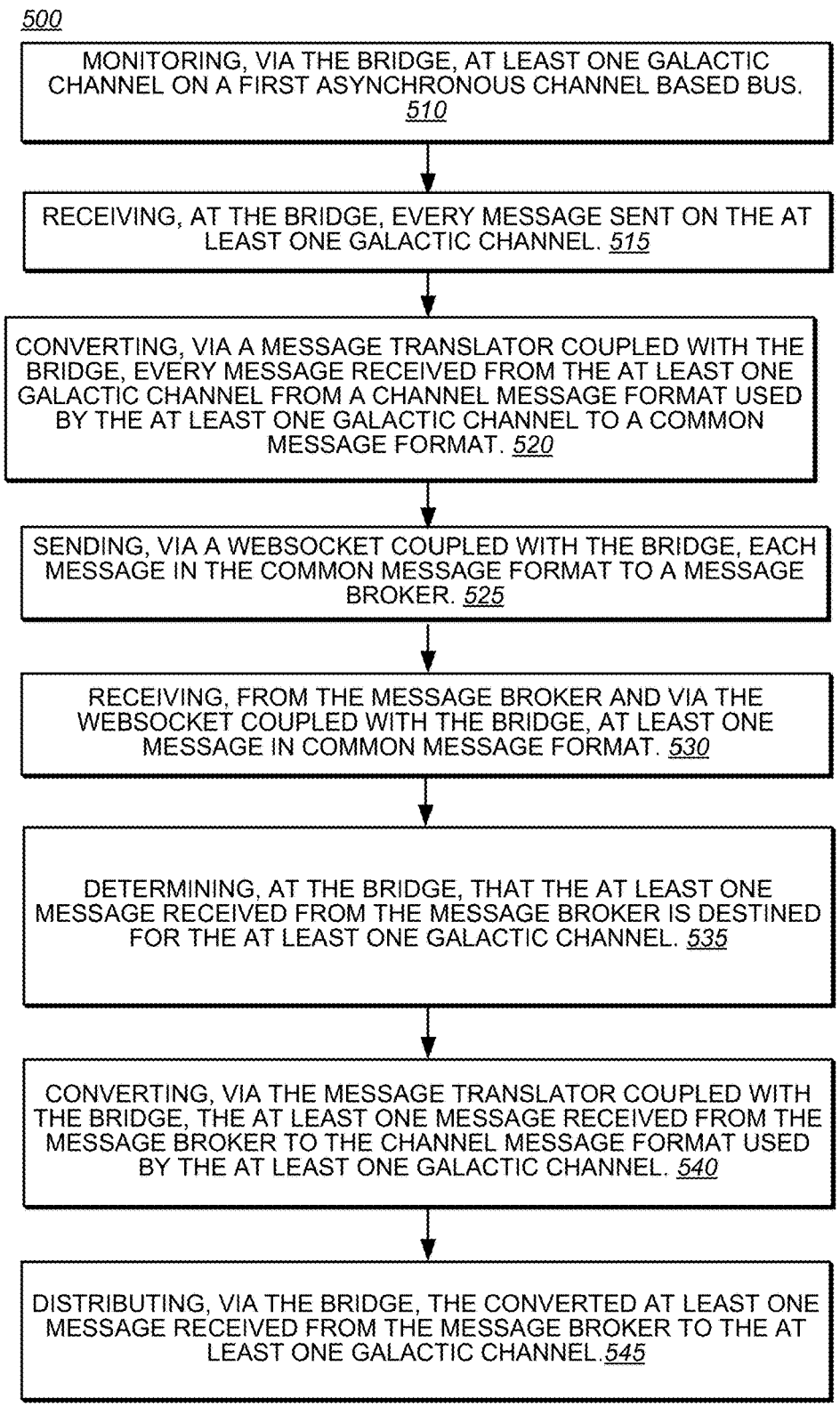
FIG. 5 illustrates a flow diagram of a method for using a bridge, an asynchronous channel based bus, and a message broker to provide asynchronous communication, according to various embodiments.

FIG. 5 illustrates a flow diagram 500 of an example method for providing asynchronous communication, according to various embodiments. Procedures of the method will be described with reference to elements and/or components of FIGS. 3-4. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media. It is further appreciated that one or more procedures described in flow diagram 500 may be implemented in hardware, or a combination of hardware with firmware and/or software.

With reference to 510 of flow diagram 500 and to FIGS. 3 and 4, one embodiment monitors, via bridge 510, at least one Galactic channel 640g on the asynchronous channel based bus 410.

In one embodiment, a dynamic creation of a plurality of channels within bus 410 is allowed. Further, a subsequent destruction of one or more of the plurality of channels within bus 410 is also allowed.

One embodiment allows a service (e.g., consumer(s) 420 and/or producer(s) 430) to publish to, and receive from, any of the plurality of channels of bus 410 and additionally allows a controller (e.g., consumer(s) 420 and/or producer(s) 430) to publish to, and receive from, any of the plurality of channels of bus 410.

In one embodiment, bus 410 broadcasts, via a monitor API 520, channel events including creation, subscription, un-subscription and destruction for bus 410.

Referring now to 515 of flow diagram 500 and to FIGS. 3 and 4, one embodiment receives, at bridge 510, every message (e.g., message 455) sent on the at least one Galactic channel 640g. For example, bridge 510 will monitor the broadcast of the monitor API 520 for every Galactic channel event on bus 410. In one embodiment, bridge 510 will ignore the broadcast of the monitor API 520 with respect to local channel events (e.g., local channel 640l).

In one embodiment, bridge 510 will monitor every Galactic channel on bus 410 and receive every message sent on every Galactic channel of bus 410.

With reference to 520 of flow diagram 500 and to FIGS. 3 and 4, one embodiment converts, via a message translator (e.g., STOMP client 610) coupled with bridge 510, every message 455 sent on the at least one Galactic channel 640g from a channel message format used by the at least one Galactic channel 640g into a common message format.

In one embodiment, bridge 510 will convert, via the message translator (e.g., STOMP client 610) coupled with bridge 510, every message received from every Galactic channel 640g from the message format used by each Galactic channel of bus 410 to a common message format.

Referring now to 525 of flow diagram 500 and to FIGS. 3 and 4, one embodiment sends, via a WebSocket 620 coupled with bridge 510, each message 455 in the common format to a message broker 555.

With reference to 530 of flow diagram 500 and to FIGS. 3 and 4, one embodiment receives, from the message broker 555 and via WebSocket 620, at least one message 640 in common message format. In one embodiment, the message 460 received from the message broker 555 is a response message to the initial message 455. In another embodiment, the message 460 received from message broker 555 may be a request message.

Referring now to 535 of flow diagram 500 and to FIGS. 3 and 4, one embodiment determines, at bridge 510, that the at least one message 460 received from the message broker 555 is destined for the at least one Galactic channel 640g.

In one embodiment, when there are pluralities of messages received from the message broker 555, bridge 510 will determine which of the plurality of messages are destined for which specific Galactic channels (such as channels 640-642 of FIG. 4) on bus 410.

With reference to 540 of flow diagram 500 and to FIGS. 3 and 4, one embodiment converts, via the message translator (e.g., STOMP client 610) coupled with bridge 510, the common format message 460 received from message broker 555 to a message format used by the at least one Galactic channel 640g.

In one embodiment, when there are pluralities of messages received from the message broker 555, the message translator (e.g., STOMP client 610) coupled with bridge 510 will convert each of the plurality of messages received from the message broker 555 to an appropriate channel message format used by each of the plurality of different Galactic channels.

Referring now to 545 of flow diagram 500 and to FIGS. 3 and 4, one embodiment distributes, via the bridge 510, the converted at least one message 460 received from message broker 555 to the at least one Galactic channel 640g.

In one embodiment, when there are pluralities of messages received from the message broker 555, bridge 510 will distribute each of the plurality of messages received from the message broker 555 to an appropriate Galactic channel of the plurality of different Galactic channels.

CONCLUSION

The Bifröst provides a solution to the single pane of glass UI problem. Embodiments provide a mental shift for developers over to stream/reactive based programming a lot easier. It facilitates more rapid development of complex reactive style experiences without the investment required to understand the lower level intricacies.

The Bifröst provides a turbocharger for UI and service architectures in software as a service (SaaS) based world that demands applications and services operate in a distributed manner.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A system comprising:
an asynchronous channel based bus having at least one Galactic channel;
a bridge coupled to the asynchronous channel based bus, the bridge to communicate with the at least one Galactic channel on the asynchronous channel based bus, and communicate with a message broker, the bridge comprising:
  a message receiver to receive each message on the at least one Galactic channel;
  a message translator, the message translator to convert each message on the at least one Galactic channel from a channel message format used by the at least one Galactic channel to a common message format;
  a socket, the socket to
    send each message converted to the common message format to the message broker, and
    receive at least one message from the message broker;
  a received message sorter, the received message sorter to
    determine that the at least one message received from the message broker is destined for the at least one Galactic channel, and
    provide the at least one message received from the message broker to the message translator; and
  the message translator to convert the at least one message received from the message broker to the channel message format used by the at least one Galactic channel; and
  the bridge to distribute the at least one message, in the channel message format, to the at least one Galactic channel.

2. The system of claim 1, wherein the asynchronous channel based bus allows a dynamic creation of one or more of a plurality channels therein.

3. The system of claim 1, wherein the asynchronous channel based bus allows a dynamic destruction of one or more of a plurality of channels therein.

4. The system of claim 3, wherein the asynchronous channel based bus allows an actor to publish to any of the plurality of channels.

5. The system of claim 3, wherein the asynchronous channel based bus allows any actor to subscribe to any of the plurality of channels.

6. The system of claim 1, wherein the asynchronous channel based bus further comprises:
a monitor API, the monitor API broadcasts channel events including creation, subscription, un-subscription and destruction.

7. The system of claim 6, wherein the bridge further comprises:
a Galactic channel monitor to listen to the monitor API for Galactic channel events,
the Galactic channel monitor ignoring local channel events.

8. The system of claim 1, wherein the bridge further comprises:
a socket watchdog that will reconnect the bridge to the message broker after an error or a disconnect.

9. The system of claim 1, wherein the common message format is a simple text oriented messaging protocol (STOMP).

10. The system of claim 1, wherein the asynchronous channel based bus is not aware that the bridge is operating.

11. The system of claim 1, wherein the bridge communicates with every Galactic channel on the asynchronous channel based bus.

12. The system of claim 1, wherein the bridge communicates with a plurality of message brokers.

13. The system of claim 1, wherein a hash convention plus snake-case is used to identify each Galactic channel on the asynchronous channel based bus.

14. A computer-implemented method for using a bridge, an asynchronous channel based bus, and a message broker to provide asynchronous communication, the computer-implemented method comprising:
monitoring, via the bridge, at least one Galactic channel on the asynchronous channel based bus;
receiving, at the bridge, every message sent on the at least one Galactic channel;
converting, via a message translator coupled with the bridge, every message received from the at least one Galactic channel from a channel message format used by the at least one Galactic channel to a common message format;
sending, via a WebSocket coupled with the bridge, each message in the common message format to a message broker;

receiving, from the message broker and via the WebSocket coupled with the bridge, at least one message in common message format;

determining, at the bridge, that the at least one message received from the message broker is destined for the at least one Galactic channel;

converting, via the message translator coupled with the bridge, the at least one message received from the message broker to the channel message format used by the at least one Galactic channel; and distributing, via the bridge, the converted at least one message received from the message broker to the at least one Galactic channel.

15. The computer-implemented method of claim 14, further comprising:

allowing a dynamic creation of a plurality of channels within the asynchronous channel based bus, and allowing a subsequent destruction of one or more of the plurality of channels within the asynchronous channel based bus.

16. The computer-implemented method of claim 14, further comprising:

allowing a service to publish to, and receive from, any of the plurality of channels of the asynchronous channel based bus; and allowing a controller to publish to, and receive from, any of the plurality of channels of the asynchronous channel based bus.

17. The computer-implemented method of claim 14, further comprising:

broadcasting, via a monitor API provided by the asynchronous channel based bus, channel events including creation, subscription, un-subscription and destruction.

18. The computer-implemented method of claim 17, further comprising:

monitoring, via the bridge, the broadcast of the monitor API for every Galactic channel event on the asynchronous channel based bus; and ignoring, via the bridge, the broadcast of the monitor API with respect to local channel events.

19. The computer-implemented method of claim 14, further comprising:

monitoring, via the bridge, every Galactic channel on the asynchronous channel based bus;

receiving, at the bridge, every message sent on every Galactic channel of the asynchronous channel based bus; and converting, via a message translator coupled with the bridge, every message received from every Galactic channel from the channel message format used by each Galactic channel to a common format message.

20. The computer-implemented method of claim 19, further comprising:

receiving, from the message broker and via the WebSocket coupled with the bridge, a plurality of messages in the common message format;

determining, at the bridge, that the plurality of messages received from the message broker are destined for a plurality of different Galactic channels on the asynchronous channel based bus;

converting, via the message translator coupled with the bridge, each of the plurality of messages received from the message broker to an appropriate channel message format used by each of the plurality of different Galactic channels; and distributing, via the bridge, each of the plurality of messages received from the message broker to an appropriate Galactic channel of the plurality of different Galactic channels.

* * * * *